June 30, 1936.   K. W. BUSCHENFELDT   2,045,750
TOURNIQUET
Filed Feb. 8, 1935   2 Sheets-Sheet 1
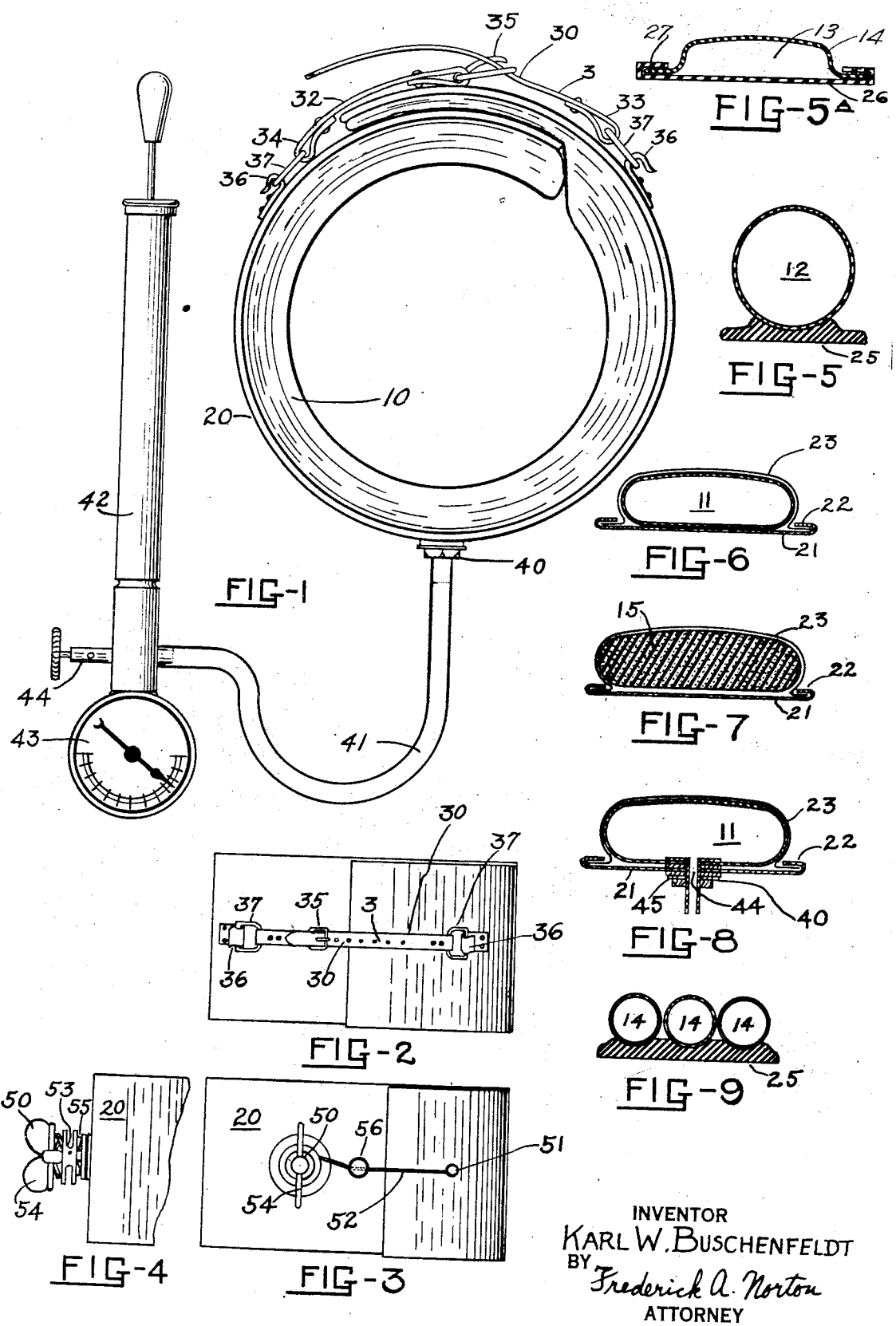
INVENTOR
KARL W. BUSCHENFELDT
BY Frederick A. Norton
ATTORNEY June 30, 1936.  K. W. BUSCHENFELDT  2,045,750
TOURNIQUET
Filed Feb. 8, 1935  2 Sheets-Sheet 2
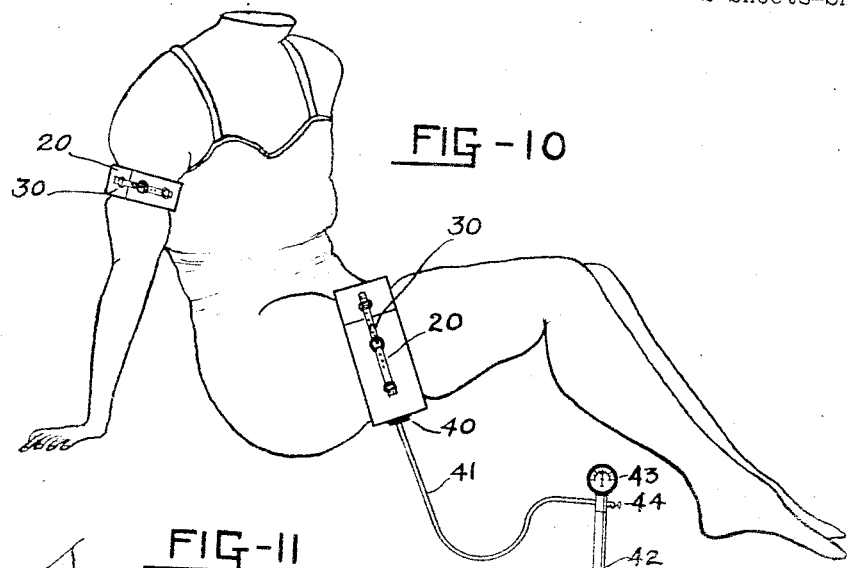
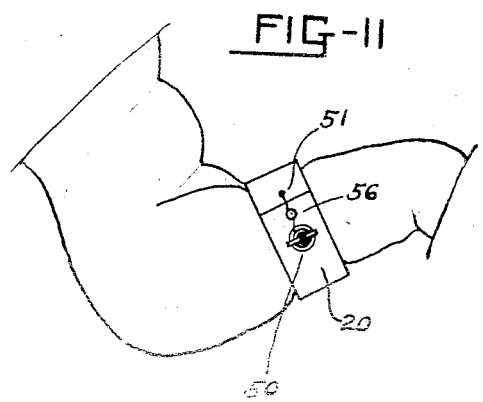
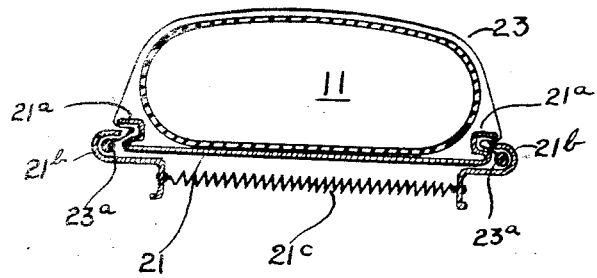
INVENTOR
KARL W. BUSCHENFELDT
BY
Frederick A. Norton
ATTORNEY Patented June 30, 1936

2,045,750

UNITED STATES PATENT OFFICE 2,045,750

TOURNIQUET

Karl W. Buschenfeldt, Stoughton, Mass.

Application February 8, 1935, Serial No. 5,552

9 Claims. (Cl. 128—327)

This invention relates to improvements in tourniquets and more particularly to a device adapted for use on body members and comprising a distensible member having a wide-bearing surface and means for supporting the distensible member and locking the same in desired position.

Hitherto it has been customary to use rubber tubing for tourniquets. Difficulties have been experienced, due to the pinching of the flesh when such tubes are tightened to a sufficient degree to stop the flow of blood in the member to which the tubing is applied. A further disadvantage of such devices resides in the fact that no control over the flow of blood in the member is possible. Other disadvantages include the feature that a positive control of the amount of pressure applied to them is not permitted and owing to the tubular construction of the devices the skin and flesh of the leg or arm to which they are applied, are deeply cut and bruised, when a sufficient tightening is secured to stop the flow of blood. Where long operations, particularly in legs and arms, are required, the tourniquets may seriously damage the skin and flesh, bruising them considerably. Transient palsies frequently follow the use of a rubber tubing tourniquet.

It is a feature of novelty of the present invention to provide improved tourniquets in which a distensible member having a broad-bearing surface is provided with an associated backing member of distinct rigidity.

It is also a feature of novelty of this invention to provide improved tourniquets with pressing members of broad-bearing surface and adapted to be fluid operated.

A further feature of novelty of the present invention is the provision of a fluid-operated, distensible tourniquet having supporting sections and provided with fluid-distending means and gauges for recording the amount of pressure applied.

Other features of novelty and advantage will be described hereinafter in the accompanying specification and illustrated in the drawings forming a part thereof.

Considering the novel invention in its general aspects, a distensible member having a wide-bearing surface and conformed generally to the circumference of the arm or leg to which it is to be applied, may be enclosed in or formed as a part of a band of metal, rubber belting, reenforced canvas, and the like. The reinforcing or supporting members are adapted to be tightened up on the leg or arm to give a desired initial tension. Thereafter the fluid-distensible bag or sac conformed to the supporting member and disposed interiorly thereof and in contact with the flesh of the arm or leg which is to be operated on, is pumped up with a suitable fluid such as air, to cause the same to distend and exert high pressure uniformly and circumferentially on the arm or leg whereby to shut off the flow of blood. As the limbs of the body vary in size and shape it is proposed to provide tourniquet members conformed generally to the body members. It is also proposed to provide the distensible sac or tubing members with a configuration conforming closely to that of its supporting member and of the body member to which it is to be applied so as to avoid any pinching of the flesh due to the improper configuration of the distensible element of the tourniquet.

Desirable results have been secured by incorporating especially conformed tubing of the type of inner tubing for automobiles in a retaining member of reinforced rubber fabric of the type used generally in belting, and of sufficient thickness to give a desired body strength. The body portion or supporting member is provided with adjustable locking means to permit it to be tightened up on a given body member. The sac or distensible portion of the member is provided with suitable valve means and pressure-measuring means to permit a fluid to be pumped therein by a suitable pump until a desired pressure is attained. It is found that with an air pump incorporated as part of the organization of the novel device herein, a pressure of six pounds and above will be sufficient for clamping off and preventing the flow of blood through an arm or small leg, while for thighs, and the like, as much as sixteen pounds of pressure may be required. It is found that when a broad-bearing surface of the order of two to four inches or more, is provided for the improved tourniquet, no bruising of the skin or flesh ensues, and it is also found that no pinching of the flesh takes place.

The distensible sac may be provided with a covering of linen, which, in turn, may be secured to the stiffening or supporting back means in any suitable manner.

While heavy rubber belting or like rubber constructions have been found suitable for the improved tourniquet members herein, excellent results have been obtained by the use of sheet metal members, such as stainless steel or the like conformed to the body members and provided with stiffening beads which may also serve as clamping means for the linen, cotton canvas, or other cloth protecting members for the tube or distensible members contained therein. In addition, rubber or other tightening and clamping means may be associated with the metal support and suitable connections provided for passing fluid from the outside of the device into the distensible sac.

In practice it is preferred to use heavy-walled tubing of rubber or metal reinforced tubing to connect the tourniquet to the pump and pressure gauge, both of which may desirably be secured at the head of the operating table under the immediate control of the anesthetist or nurse assigned to that duty. A sterile towel or other member may be disposed over the tourniquet and other parts so as to leave the leg or arm free for operating.

Owing to the relatively broad band of pressure that may be applied to a leg or arm by the device of the present invention, it will be possible to apply the tourniquet high up on the arm or leg, that is, in the neighborhood of the axillae or pubes, and thereby maintain these devices at a considerable distance from the operating surgeon and the field of operation, particularly where the operations are on the lower legs or forearms.

As bone operations are rather long-drawn out, and complete blanching of the area of operation is a most distinct desideratum, the ability to completely shut off the blood supply of a member while at the same time avoiding any bruising of the flesh, is a distinct novelty in surgical equipment and is provided by the present tourniquet.

Operations on the limbs requiring cutting, arranging and setting bones and fragments, can now be done without requiring the use of sponges around the area of operation to soak up excess blood, as the field of operation is completely blanched by the tourniquet.

In addition to the features of advantage noted above, the use of the improved tourniquet of the present invention permits the surgeon to exercise an absolute control of the conditions of the operation. Among these may be mentioned the matter of maintaining a flow of blood through the members at definite periods to preclude the initiation of any undesirable post-operative results. With the use of the old style tube tourniquet, when a tourniquet was released to permit blood to flow through legs or arms in open wounds, it permitted the blood to gush forth without control. This resulted in an attempted speeding up of the operation to cut down the time required for the complete shutting off of the blood through a given member. However, with the present invention a slow release of pressure may be directed to a point where the blood may be permitted to trickle through the blood vessels and thus maintain life in the members and without any accompanying gushing of blood from the vessels in the area of the operation and attendant necessity of soaking up by means of sponges, including the operation area. When the recirculation has been established for a sufficient length of time a few strokes of the pump will again shut off the supply of blood and permit the operation to be proceeded with.

The foregoing advantages of the novel tourniquet of the present invention will be better understood by reference to the accompanying drawings and description thereof, in which certain specific forms of the device and their use are illustrated and described.

In the drawings like numerals refer to similar parts throughout the several views, of which—

Fig. 1 is a plan view of an improved tourniquet with associated pump and pressure-gauge mechanism;

Fig. 2 is a side elevation of a tourniquet clamp member;

Fig. 3 is a view similar to Fig. 2 showing a modified form of tourniquet device with pressure-regulating and registering mechanism;

Fig. 4 is a detailed view of the pressure-applying and registering mechanism of the device of Fig. 3;

Figs. 5 and 5a are cross-sections of tourniquet members having a heavy rubber supporting backing;

Fig. 6 is a cross-section of a tourniquet member having a metal backing and a fabric covering for the distensible sac member;

Fig. 7 is a view similar to Fig. 6 showing a sponge-rubber compression member;

Fig. 8 is a cross-section through the inner valve of a distensible sac member having a supporting metal band and fabric covering;

Fig. 9 is a cross-section of a tourniquet having a plurality of small diameter distensible sac members and heavy rubber supporting strap;

Fig. 10 is an elevation showing the mode of applying tourniquet members to legs and arms;

Fig. 11 is an elevation showing modified tourniquet of Fig. 3 in position on the leg; and Fig. 12 is a view similar to Fig. 6 showing a special clamping and retaining means for holding the fabric cover on the distensible sac member.

Considering the constructions shown more in detail and with particular reference to Fig. 1, the improved tourniquet of the present invention comprises a distensible sac member or device 10 operatively secured to and supported by a relatively stiff backing member 20 of thick rubber, metal, or the like. The tourniquet is adapted to be pulled together and held in ring form by means of buckle-securing members or the like, designated generally by the numeral 30. A suitable air or fluid connection 40 is connected to the distensible sac or tubing member 10 and is in turn connected through a flexible tube 41 to a pump 42. The pump 42 may be provided with a pressure gauge 43 and a relief valve 44. While the relief valve and pressure gauge have been shown directly connected and incorporated in the pump mechanism, it will, of course, be appreciated that both of these elements may be incorporated into and inserted in the pressure system at any desired point, or they may be set up as individual elements and incorporated in any portion of the device. Where a tourniquet is permanently used in operating rooms, the pressure relief valve and the gauge, with or without the pump mechanism, may be fixedly or detachably attached to the operating table and the connecting tube 41 made of any desired length and of suitable wall thickness. The tubing used is preferably pressure tubing to adapt it to withstand pressures varying from 2 pounds to 25 or 30 pounds per square inch.

The device herein may comprise a distensible tubular sac 11 mounted on a metal base 21 of generally strip construction. The strip 21 is provided with inturned edge beads 22 adapted to fold over and crimp the edges of a protective fabric covering 23 placed over the member 11. It is to be noted that the distensible sac member 11 will be so configured and arranged as to conform to the general annular shape of the supporting member 21. This latter member, in its turn, is so configured and arranged as to conform closely to the body member to which it is to be applied, whether it be a thigh, a lower leg or an arm. For these different uses, of course, the sizes of the tourniquets will be varied.

The sac 11, as indicated more particularly in Fig. 8, is provided with an outlet tube 44, which is secured to the support 21 in any suitable manner, as by means of lock-nut combination 45. Where a heavy rubber support or the like of re-enforced fabric of any suitable material is used, as shown in Fig. 5 at 25, a distensible tube 12 may be used and vulcanized, or otherwise secured to the backing member. In the form shown in Fig. 5a the integral backing member 26 of heavy rubber belting has a sac 13 formed by applying a distensible rubber dam or sheeting 14 in place on the member 26, and then cementing same in position, after which stiffening strap supports 27, preferably made of the same material as that of member 26 are secured over the edges. The material of member 26 is substantially rigid to provide a structurally strong body member.

Referring now to Fig. 9, the distensible members of the tourniquet may comprise a plurality of small-diameter tubing members designated generally by the numeral 14. The use of such members provides a wide surface area of contact, together with the advantage of speedy gripping of the flesh of a body member by the several tubulatures.

Considering the modifications indicated in cross-section of Fig. 7, a compressible material such as sponge-rubber 15 may be used as a permanent filling for the tourniquet member and is particularly adapted for use in the mechanically compressed tourniquet devices of the type shown in Figs. 3, 4, and 11.

In Fig. 12 the distensible tube 11 is mounted on the usual support 21 and provided with a fabric cover 23. The member 21 is flanged at its edges, as indicated at 21a, to receive and lock gripping members 21b, comprising gripping fingers on opposed sides of the member 21 and held in tension by spring members 21c, or other suitable tensioning devices. The fabric cover 23 may be provided with edge portions 23a of an appreciable thickness adapted to be locked in place by the members 21a and 21b.

The arcuate backing member 20 in any of its various modifications 21 or 25, is generally annular, as indicated more particularly in Fig. 1, and is secured together by suitable means, such as strap members 30. The locking mechanism comprises a pair of strap members 31 and 32 having loops 33, 34, and buckle 35, cooperating therewith. Flat hook members 36 are fixedly secured to the member 20 and links 37 are provided on the straps for engaging the hooks. When the tourniquet 10 is placed in position on a leg or arm, it is tightened up as far as possible by the strap members 30. This gives a desired tightening and initial clamping of the tourniquet about the body member which is being operated on. After this initial tightening the distensible section 10 of the device is inflated by means of the pump until the flow of blood through the body member has been stopped. In various body members this condition depends on the size of the arm or leg and the pressure required will vary accordingly. Six to fifteen pounds air pressure has been found to be a satisfactory working range in the operation of such devices in practical use.

If during the course of the operation the operating surgeon wishes to flush out the blood vessels in the operating area or field of operation, the pressure in the distensible section 10 of the tourniquet may be relieved by operating the release valve 44, after which the pressure can be built up by a few strokes of the pump. In applying the tourniquet a sterile towel may be placed over the body member and the tourniquet applied thereover. When the tourniquet is fixed in position the towel may be folded back over the tourniquet parts, screening them from the surgeon and assuring him a sterile operating field.

The several distensible sac members may be, and preferably are, provided with a unitary pump and control means.

Where a mechanical tensioning device is desired a ratchet member 50 may be secured to one end of the backing ring member 20, while a pin 51 is provided at the other end of this member. A tensioning member 52 of heavy cord or wire may be secured to the member 51 and wound up on a reel or spindle member 53 by means of the wings 54 of the ratchet member, a locking or ratchet member 55 being provided to maintain the same in tension. A pressure-registering or indicating device 56 may be associated with this device to permit the control of the pressure applied by the tourniquet. This modification provides a strictly mechanical pressure control which may be adapted for uses in places where it is not practical to carry a pneumatic or fluid-operative device.

It will now be appreciated that there have been provided improvements in tourniquet devices which permit accurate blanching of body members, such as arms and legs, where surgical operations are to be performed, and which devices permit the maintenance of blood flow through the parts being operated on at the will and under the control of the operating surgeon.

While certain novel features of the invention have been shown and described and are pointed out in the annexed claims, it will be understood that various omissions, substitutions and changes in the forms and details of the device illustrated and in its operating may be made by those skilled in the art or without departing from the spirit of the invention.

I claim:

1. A tourniquet comprising a distensible member having a slightly arcuate almost flat bearing surface, a metallic support of unyielding sheet metal for the said member disposed about the outer surface thereof, and means for distending the said distensible member.

2. A tourniquet comprising a distensible member having a slightly arcuate substantially flat bearing surface, an outer metallic support of unyielding sheet metal for the said member, means for locking the support and other means for distending the said distensible member.

3. A tourniquet comprising a distensible member having a substantially flat wide-bearing surface; an outer non-distensible metallic support of unyielding sheet metal for the said member, the said non-distensible support being flexible and provided with means for locking same in a determined position; and means for distending the said distensible member.

4. A tourniquet comprising a tubular distensible member having a substantially flat wide-bearing surface; an outer non-distensible metallic support of unyielding sheet metal for the said member and conformed thereto; the said non-distensible support being flexible and provided with securing means for adjustably holding same in a determined position; and means for adjustably distending the said distensible member.

5. An improved tourniquet comprising an unyielding annular strip of metal, means for adjustably securing the ends of the strip of metal together to form a ring-shaped device, a protective fabric member disposed on the inner surface of the so-formed ring and secured thereto, a distensible rubber sac disposed interiorly of the ring and between the metal body portion and the fabric member; and a fluid inlet secured to the sac and passing through the metal body.

6. An improved support for distensible tourniquets comprising an unyielding flat sheet member of substantially rigid metal material bent in ring shape to form an open-ended annulus, one end of said annulus being fitted within the body of the ring, means on the outside of said member for attachment of strap members used in adjustably varying the effective circumference of the said member, and means secured to the said member and coextensive therewith for retaining a distensible sac in the interior thereof.

7. In a device of the type described in claim 6, the improvements comprising securing means for a fabric member disposed within the support and secured thereto, including clamping means disposed on the top of the support and in gripping engagement with the said fabric member.

8. A tourniquet, including in combination, an unyielding flat sheet metal member of substantial rigidity bent in ring shape to form an open-ended annulus, one end of said annulus being fitted within the body of the ring, means on the outside of said member for attachment of strap members used in adjustably varying the effective circumference of the said member, spring gripping means secured to said member along the edges thereof, a retaining member secured to the metal member by the gripping means, and a pressure-responsive body member in the retaining member.

9. An improved support for distensible tourniquets comprising a stainless sheet metal member bent in ring shape to form an open-ended annulus, one end of said annulus being fitted within the body of the ring, means on the outside of said member for attachment of strap members used in adjustably varying the effective circumference of the said member, and means secured to the said member and coextensive therewith for retaining a distensible sac in the interior thereof.

KARL W. BUSCHENFELDT.